(12) United States Patent
Yoon et al.

(10) Patent No.: US 11,609,404 B2
(45) Date of Patent: Mar. 21, 2023

(54) CAMERA MODULE

(71) Applicant: SAMSUNG ELECTRO-MECHANICS CO., LTD., Suwon-si (KR)

(72) Inventors: Young Bok Yoon, Suwon-si (KR); Bong Won Jeong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 310 days.

(21) Appl. No.: 17/069,991

(22) Filed: Oct. 14, 2020

(65) Prior Publication Data

US 2021/0286149 A1     Sep. 16, 2021

(30) Foreign Application Priority Data

Mar. 13, 2020  (KR) .................. 10-2020-0031171

(51) Int. Cl.
  *G02B 7/04*   (2021.01)
  *G02B 13/00*  (2006.01)
  *G03B 5/00*   (2021.01)
  *G03B 13/34*  (2021.01)
  *G02B 27/64*  (2006.01)

(52) U.S. Cl.
  CPC ........... *G02B 7/04* (2013.01); *G02B 13/0065* (2013.01); *G02B 27/646* (2013.01); *G03B 5/00* (2013.01); *G03B 13/34* (2013.01); *G03B 2205/0007* (2013.01)

(58) Field of Classification Search
  CPC .... G02B 13/0065; G02B 27/646; G02B 7/04; G02B 7/02; G03B 5/00; G03B 13/34; G03B 2205/0007

USPC ........................................................ 359/823
See application file for complete search history.

(56) References Cited

U.S. PATENT DOCUMENTS

| | | | | |
|---|---|---|---|---|
| 3,604,795 A | * | 9/1971 | Crandall | G03B 37/00 355/56 |
| 5,270,853 A | * | 12/1993 | Bashkansky | G01N 21/4795 359/10 |
| 7,625,089 B2 | | 12/2009 | Youssefi et al. | |
| 2002/0159029 A1 | * | 10/2002 | Ross | A61B 3/1015 351/212 |
| 2004/0136093 A1 | * | 7/2004 | Nishioka | G02B 13/0045 359/676 |

(Continued)

FOREIGN PATENT DOCUMENTS

| | | |
|---|---|---|
| CN | 1475829 A | 2/2004 |
| CN | 2800328 Y | 7/2006 |

(Continued)

OTHER PUBLICATIONS

Korean Office Action dated Apr. 15, 2021 in counterpart Korean Patent Application No. 10-2020-0031171 (5 pages in English)(4 pages in Korean).

(Continued)

*Primary Examiner* — William R Alexander
(74) *Attorney, Agent, or Firm* — NSIP Law

(57) ABSTRACT

A camera module includes: a lens module comprising one or more lenses; and an optical path adjustment member disposed to face the lens module or an imaging plane, and configured to be driven in a direction of an optical axis of the lens module to vary a distance from a rearmost lens of the lens module to the imaging plane.

19 Claims, 13 Drawing Sheets

(56) References Cited

U.S. PATENT DOCUMENTS

| | | | |
|---|---|---|---|
| 2006/0152677 A1* | 7/2006 | Youssefi | A61B 3/1015 |
| | | | 351/205 |
| 2009/0122406 A1 | 5/2009 | Rouvinen et al. | |
| 2018/0020912 A1* | 1/2018 | Bublitz | G01B 9/02041 |
| | | | 351/206 |
| 2019/0004328 A1 | 1/2019 | Lee et al. | |
| 2020/0028999 A1 | 1/2020 | Jun | |
| 2020/0057313 A1 | 2/2020 | Lee et al. | |
| 2021/0080690 A1 | 3/2021 | Lee et al. | |

FOREIGN PATENT DOCUMENTS

| | | |
|---|---|---|
| CN | 109218576 A | 1/2019 |
| CN | 109963058 A | 7/2019 |
| CN | 110737149 A | 1/2020 |
| GB | 1268 403 A | 5/1969 |
| JP | 2004-61993 A | 2/2004 |
| JP | 2006-171449 A | 6/2006 |
| JP | 2007-149934 A | 6/2007 |
| JP | 2009-526257 A | 7/2009 |
| KR | 10-2019-0071569 A | 6/2019 |
| TW | 201351976 A | 12/2013 |

OTHER PUBLICATIONS

Chinese Office Action dated May 6, 2022 in corresponding Chinese Patent Application No. 202110011360.1 (10 pages in English and 10 pages in Chinese).

* cited by examiner

CAMERA MODULE

CROSS-REFERENCE TO RELATED APPLICATIONS

This application claims the benefit under 35 U.S.C. § 119(a) of Korean Patent Application No. 10-2020-0031171 filed on Mar. 13, 2020 in the Korean Intellectual Property Office, the entire disclosure of which is incorporated herein for all purposes.

BACKGROUND

The following description relates to a camera module capable of adjusting a back focal length.

A portable terminal may include a camera module to perform functions such as photography, videography, and video calls. The camera module for the portable terminal is manufactured in a significantly small size due to spatial limitations of the portable terminal. For example, it is difficult for a length or a volume of the camera module to exceed the thickness of the portable terminal. The size limitation of the camera module may also limit the performance of the camera module. For example, since it is difficult to sufficiently secure a distance (back focal length) from a back lens to an imaging plane (or an image sensor) in a camera module for a portable terminal, it is difficult to perform focus adjustment, adjustment of a focus magnification, imaging of a long-distance object, and the like.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a lens module comprising one or more lenses; and an optical path adjustment member disposed to face the lens module or an imaging plane, and configured to be driven in a direction of an optical axis of the lens module to vary a distance from a rearmost lens of the lens module to the imaging plane.

The optical path adjustment member may be configured such that an optical path of incident light incident on the optical path adjustment member is parallel to an optical path of emitted light emitted from the optical path adjustment member.

The camera module of claim 1, wherein the optical path adjustment member may include a first optical path folding portion and a second optical path folding portion. The first optical path portion may be configured to reflect or refract light incident from the lens module to the second optical path folding portion. The second optical path folding portion may be configured to reflect or refract the light reflected or refracted from the first optical path folding portion to the imaging plane.

The camera module may further include: a first driving assembly configured to move the optical path adjustment member in a direction parallel to the optical axis.

A distance from the rearmost lens to the optical path adjustment member may be smaller than a distance from the optical path adjustment member to the imaging plane.

The camera module may further include: a first optical path folding member configured to reflect or refract light reflected from an object to the lens module.

The camera module may further include: an image stabilization apparatus configured to drive the first optical path folding member in a direction intersecting the optical axis.

The lens module may further include a lens configured to have different lengths in a first direction intersecting the optical axis and a second direction intersecting the optical axis.

The camera module may further include: a second optical path folding member disposed between the optical path adjustment member and the imaging plane, and configured to reflect or refract light to the imaging plane.

The camera module may further include: a second driving assembly configured to move the lens module in the direction of the optical axis.

The camera module may further include: a support member supporting the optical path adjustment member; a housing configured to receive the lens module and the support member; and a bearing member disposed between the support member and the housing to enable movement of the support member in the direction of the optical axis.

In another general aspect, a camera module includes: a first lens module including a first lens group disposed along a first optical axis; a second lens module including a second lens group disposed along a second optical axis parallel to the first optical axis; an optical path adjustment member configured to reflect or refract light refracted by the first lens module to the second lens module; a first driving assembly configured to move the optical path adjustment member in a direction of the first optical axis; a second driving assembly configured to move the first lens module in the direction of the first optical axis; and a third driving assembly configured to move the second lens module in the direction of the second optical axis.

The camera module may further include: a support member supporting the optical path adjustment member; a housing configured to receive the lens module and the support member; and a bearing member disposed between the support member and the housing to enable movement of the support member in the direction of the first optical axis.

The camera module may further include: an optical path folding member configured to reflect or refract incident light to the first lens module, wherein the incident light is incident in a direction of a third optical axis perpendicular to the first optical axis.

The first driving assembly may be further configured to move the optical path adjustment member relative to the first lens module and the second lens module in the direction of the first optical axis. The second driving assembly may be further configured to move the first lens module relative to the second lens module and the optical path adjustment member in the direction of the first optical axis. The third driving assembly may be further configured to move the second lens module relative to the first lens module and the optical path adjustment member in the direction of the second optical axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
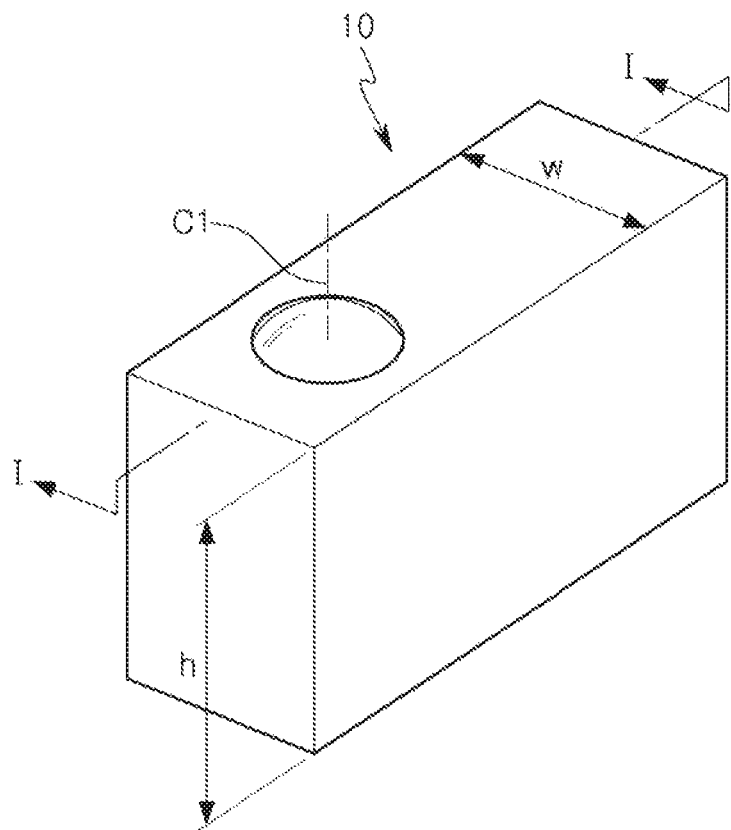
FIG. 1 is a perspective view of a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

A camera module according to the disclosure herein may be mounted in a portable electronic product. For example, the camera module may be mounted on a mobile phone, a laptop, or the like. However, an application of the camera module is not limited to the above-described electronic products. For example, the camera module may be installed in an automated teller machine (ATM), a television for interactive broadcasting, and the like.

Figure 2:
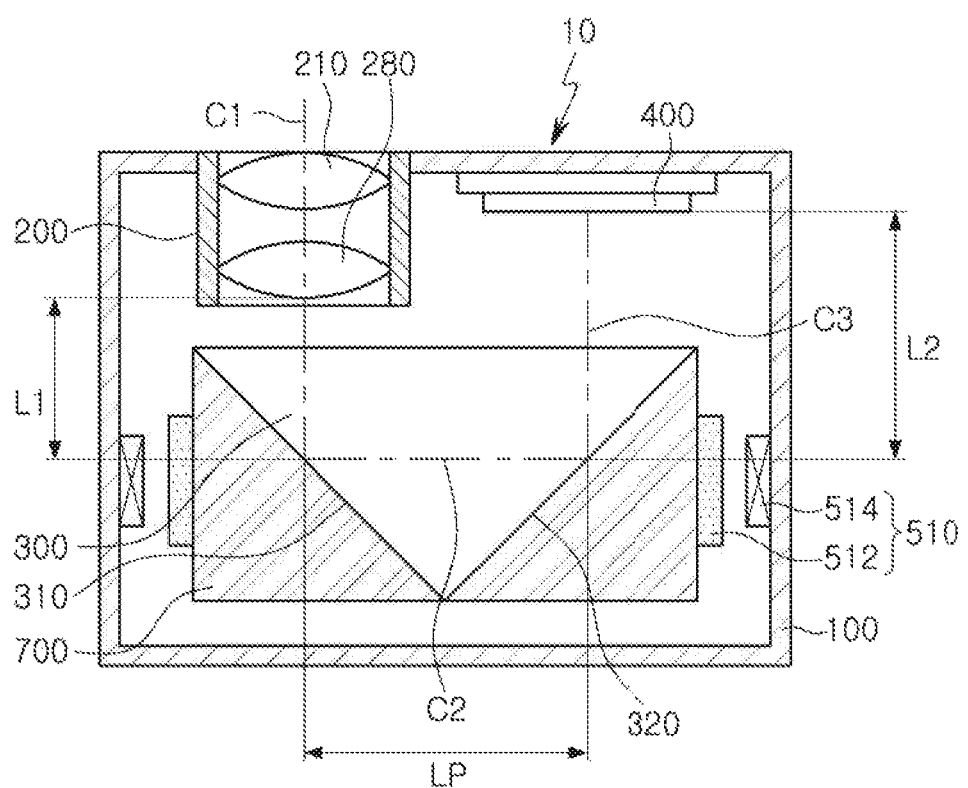
FIG. 2 is a cross-sectional view taken along line I-I of FIG. 1.
Figure 3:
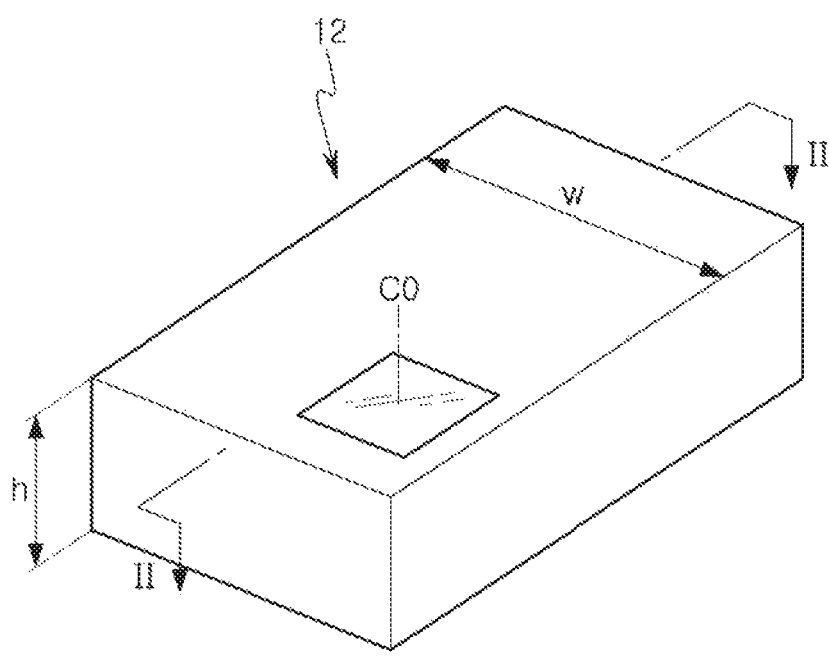
FIG. 3 is a perspective view of a camera module, according to an embodiment.
Figure 4:
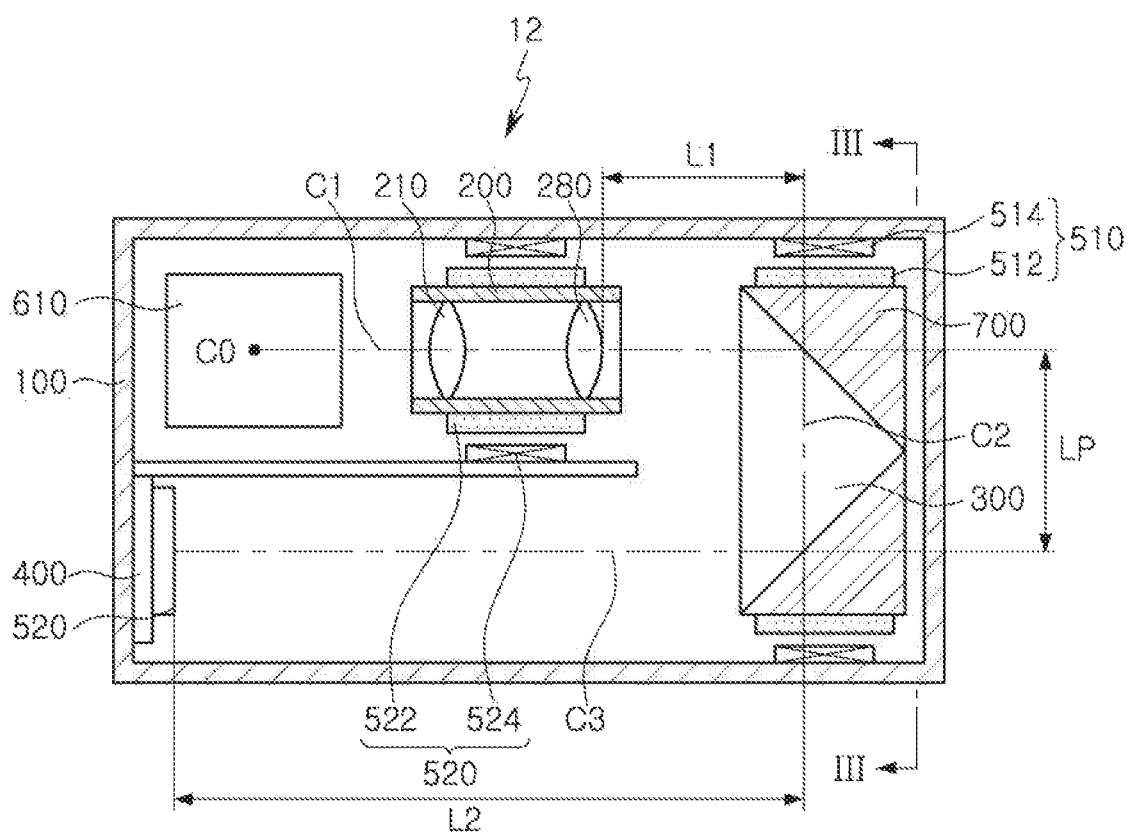
FIG. 4 is a cross-sectional view taken along line II-II of FIG. 3.

FIGS. 1 and 2 illustrate a camera module 10, according to an embodiment.

The camera module 10 may be configured to enable short-distance and long-distance image capturing. For example, the camera module 10 may image an object located at a short distance and a long distance by adjusting a focal length. The camera module 10 may be configured to be mounted on a portable terminal. For example, either one or both of a height (h) and a width (w) of the camera module 10 may be less than or equal to the thickness of the portable terminal.

Referring to FIGS. 1 and 2, the camera module 10 may include, for example, a housing 100, a lens module 200, an optical path adjustment member 300, and an image sensor 400. However, the configuration of the camera module 10 is not limited to the above-described members. For example, the camera module 10 may further include a first driving assembly 510 and a support member 700.

The housing 100 may be configured to receive main components of the camera module 10. For example, a space for receiving the lens module 200, the optical path adjustment member 300, and the image sensor 400 may be formed inside the housing 100. The housing 100 may form an outer body of the camera module 10. The housing 100 may have a substantially hexahedral shape. However, the shape of the housing 100 is not limited to a hexahedron.

The lens module 200 may be configured to image light reflected from an object on the imaging plane of the image sensor 400. The lens module 200 may include one or more lenses. For example, the one or more lenses may include a forwardmost lens 210 and a rearmost lens 280 each having refractive power. The lenses 210 and 280 may have refractive power of the same shape or different orientations. For example, the forwardmost lens 210 may have positive refractive power, and the rearmost lens 280 may have negative refractive power. One or more lenses may be further disposed between the forwardmost lens 210 and the rearmost lens 280. For example, two or more additional lenses may be disposed between the forwardmost lens 210 and the rearmost lens 280. The lenses 210 and 280 may be sequentially disposed along an optical axis C1. The lens module 200 may be disposed on one side of the housing 100. For example, the lens module 200 may be immovably fixed on an upper portion of the housing 100.

The image sensor 400 is configured to convert an optical signal refracted by the lens module 200 into an electrical signal. The image sensor 400 may be manufactured in a CCD form. One surface of the image sensor 400 may form an imaging plane on which light refracted by the lenses 210 and 280 is imaged. The image sensor 400 may be disposed to image the light refracted by the lens module 200 without distortion. For example, the image sensor 400 may be disposed on one side of the housing 100 to have an optical axis C3 parallel to the optical axis C1 of the lens module 200.

The optical path adjustment member 300 is disposed to face the lens module 200 and the imaging plane of the image sensor 400. For example, an incident surface of the optical path adjustment member 300 may face the lens module 200, and an emitting surface of the optical path adjustment member 300 may face the imaging plane of the image sensor 400. The optical path adjustment member 300 may convert an optical path so that light incident through the lens module 200 may be imaged on the imaging plane of the image sensor 400. For example, the optical path adjustment member 300 converts an optical path so that the optical path of the incident light incident from the lens module 200 to the optical path adjustment member 300 and the optical path of emitted light emitted from the optical path adjustment member 300 are parallel. The optical path adjustment member 300 may include a plurality of optical path folding portions. For example, the optical path adjustment member 300 may include a first optical path folding portion 310 and a second optical path folding portion 320. The first optical path folding portion 310 may be configured to reflect or refract light incident from the lens module 200 to the second optical path folding portion 320, and the second optical path folding portion 320 may be configured to further reflect or refract the reflected or refracted light to an imaging plane of the image sensor 400. A reflective surface of the first optical path folding portion 310 and a reflective surface of the second optical path folding portion 320 may generally form a right angle.

A support member 700 may be configured to stably support the optical path adjustment member 300 inside the housing 100. The support member 700 may be configured to block unnecessary light penetrating into the optical path adjustment member 300. For example, the support member 700 may be configured to surround a portion of the optical path adjustment member 300 except for the incident surface and the emitting surface. The support member 700 may be configured to limit a movement direction of the optical path adjustment member 300. For example, the support member 700 may be coupled to the housing 100 through a projection or the like, and induce so that the moving direction of the optical path adjustment member 300 is parallel to the optical axes C1 and C3.

A first driving assembly 510 may be configured to drive the optical path adjustment member 300 in a direction parallel to the optical axes C1 and C3. For example, the first driving assembly 510 moves the optical path adjustment member 300 to be closer to the lens module 200 and the image sensor 400 or to be farther away from the lens module 200 and the image sensor 400. The first driving assembly 510 may include, for example, a first driving magnet 512 and a first driving coil 514. The first driving magnet 512 may be disposed on the optical path adjustment member 300 or the support member 700, and the first driving coil 514 may be disposed on the housing 100. The first driving magnet 512 and the first driving coil 514 may be disposed to face each other, so as to provide a driving force required for the movement of the optical path adjustment member 300.

The camera module 10 configured as described above may sufficiently secure a back focal length (BFL) from the rearmost lens 280 to the imaging plane of the image sensor 400. For example, since the BFL of the camera module 10 is a sum of a distance L1 from an image-side surface of the rearmost lens 280 to the first optical path folding portion 310, a distance LP from the first optical path folding portion 310 to the second optical path folding portion 320, and a distance L2 from the second optical path folding portion 320 to the imaging plane of the image sensor 400, a distance LP from at least the first optical path folding portion 310 to the second optical path folding portion 320 may be additionally secured.

The lens module 200, the optical path adjustment member 300, and the image sensor 400 may have a predetermined distance relationship. For example, the distance from the rearmost lens 280 of the lens module 200 to the optical path adjustment member 300 may be smaller than the distance from the optical path adjustment member 300 to the imaging plane of the image sensor 400. That is, the distance L1 from the image-side surface of the rearmost lens 280 to the first optical path folding portion 310 may be smaller than the distance L2 from the second optical path folding portion 320 to the imaging plane of the image sensor 400.

The camera module 10 may enable rapid focus adjustment through the optical path adjustment member 300. For example, the camera module 10 may simultaneously increase or decrease the distances L1 and L2, which are the main components of the back focal length (BFL), by moving the optical path adjustment member 300 in the direction of the optical axes C1 and C2. Therefore, the camera module 10 may rapidly adjust the focus of the camera module 10 by moving the optical path adjustment member 300 slightly. Further, since the camera module 10 moves the optical path adjustment member 300 only slightly for focus adjustment, it is possible to significantly reduce a driving current required for the focus adjustment.

FIGS. 3 to 6 illustrate a camera module 12, according to an embodiment.

A camera module 12 may be configured to enable short-distance and long-distance image capturing. For example, the camera module 12 may capture an object located at a short distance and a long distance by adjusting a focal length. The camera module 12 may be configured to be mounted on a portable terminal. For example, either one or both of a height (h) and a width (w) of the camera module 12 may be less than or equal to the thickness of the portable terminal. For example, the camera module 12 may have a height (h) smaller than the thickness of the portable terminal.

The camera module 12 may include, for example, the housing 100, the lens module 200, the optical path adjustment member 300, and the image sensor 400. However, the configuration of the camera module 12 is not limited to the above-described members. For example, the camera module 12 may further include the first driving assembly 510 and the support member 700.

Referring to FIGS. 3 to 6, camera module 12 may further include a second driving assembly 520, a first optical path folding member 610, and a bearing member 800.

The second driving assembly 520 may be configured to move the lens module 200 along an optical axis C1. For example, the second driving assembly 520 may move the lens module 200 to be closer to the optical path adjustment member 300 or to be farther away from the optical path adjustment member 300. The second driving assembly 520 may include a second driving magnet 522 and a second driving coil 524. The second driving magnet 522 may be disposed on the lens module 200, and the second driving coil 524 may be disposed on the housing 100. The second driving magnet 522 and the second driving coil 524 may be disposed to face each other, so as to provide a driving force required for the movement of the lens module 200.

A first optical path folding member 610 may convert an optical path incident in a height direction of the camera module 12 into a longitudinal direction of the camera module 12. For example, the first optical path converting member 610 may reflect or refract the optical path incident on the optical axis C0 in the direction of the optical axis C1 of the lens module 200.

The camera module 12 may secure a back focal length (BFL) from the rearmost lens 280 to the imaging plane of the image sensor 400 to be significantly long. For example, since the camera module 12 may sufficiently secure a distance L2 from the optical path adjustment member 300 to an imaging plane of the image sensor 400, the camera module 12 may be suitable for a telephoto optical system having a relatively long back focal length.

The distance from the rearmost lens 280 of the lens module 200 to the optical path adjustment member 300 may be smaller than the distance from the optical path adjustment member 300 to the imaging plane of the image sensor 400. That is, the distance L1 from the image-side surface of the rearmost lens 280 to the first optical path folding portion 310 may be smaller than the distance L2 from the second optical path folding portion 320 to the imaging plane of the image sensor 400.

Figure 5:
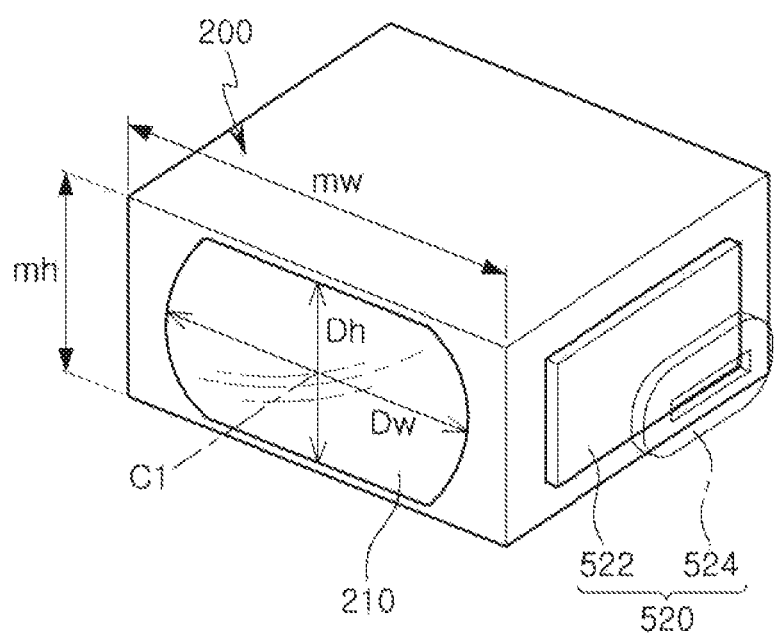
FIG. 5 is a perspective view of a lens module illustrated in FIG. 4.

The lens module 200 may include the lens 210 having a different length in a first direction crossing an optical axis and a second direction crossing the optical axis. For example, as illustrated in FIG. 5, any one or any combination of any two or more of the lenses constituting the lens module 200 may have a length (Dh) in a first direction intersecting the optical axis C1 and a length (Dw) in a second direction intersecting the optical axis C1. Alternatively, the lens module 200 may be configured such that the length (mh) in the first direction intersecting the optical axis C1 and the length (mw) in the second direction intersecting the optical axis C1 are different as illustrated in FIG. 5.

Figure 6:
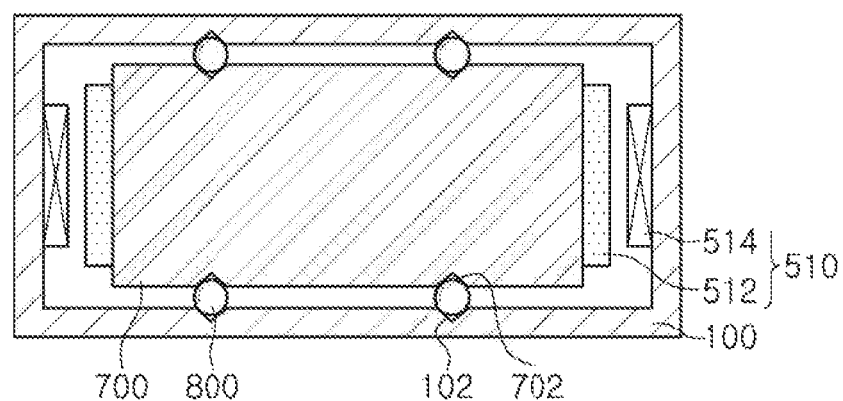
FIG. 6 is a cross-sectional view taken along line III-Ill of FIG. 4.

The camera module 12 may include elements for assisting a smooth movement of the optical path adjustment member 300. For example, as shown in FIG. 6, the camera module 12 may include a bearing member 800. The bearing member 800 may be disposed between the optical path adjustment member 300 or the support member 700 and the housing 100, to assist the optical path adjustment member 300 to smoothly move in the optical axis direction C1. Grooves 102 and 702 for accommodating the bearing member 800 may be formed in the housing 100 and the support member 700, respectively. The cross-sections of the grooves 102 and 702 may be generally an inverted triangular shape. However, the cross-sectional shape of the grooves 102 and 702 is not limited to an inverted triangular shape.

In the camera module 12 configured as described above, since the lens module 200, the optical path adjustment member 300, and the optical axes C1, C2, and C3 of the image sensor 400 extend in a direction intersecting the height (h) of the camera module 12, the configuration of the camera module 12 is advantageous for thinning and miniaturizing the camera module 12. In addition, the camera module 12 may rapidly change the back focal length (BFL) by moving the lens module 200 and the optical path adjustment member 300 in the optical axis direction C1, thereby rapidly adjusting the focal length.

Figure 7:
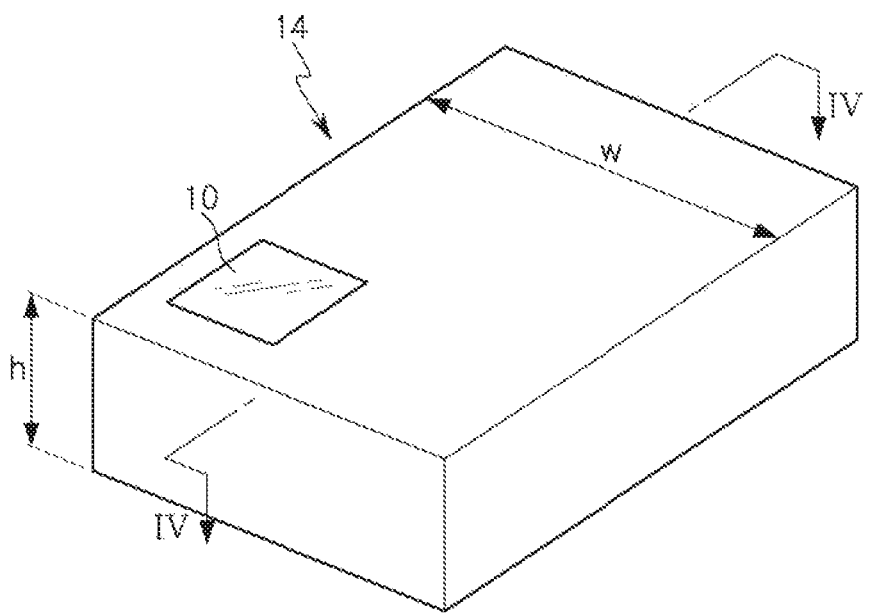
FIG. 7 is a perspective view of a camera module, according to an embodiment.
Figure 8:
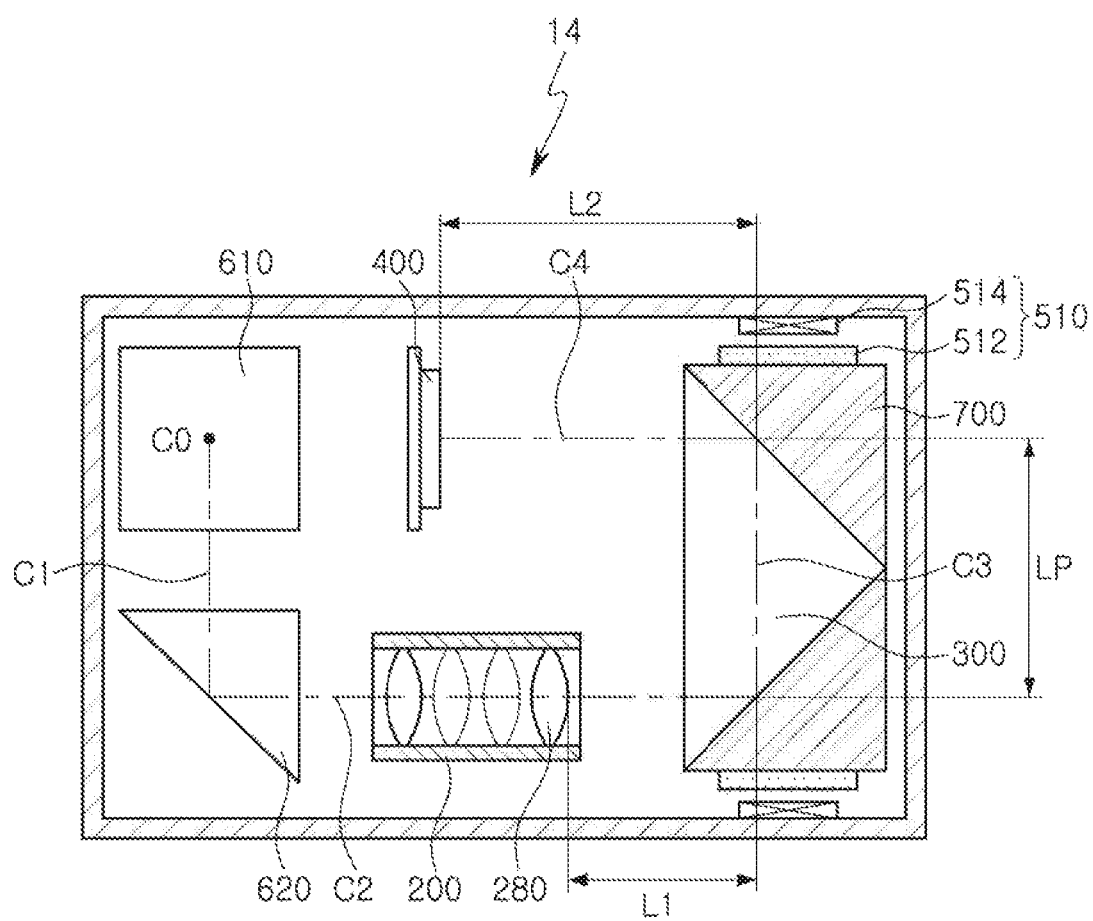
FIG. 8 is a cross-sectional view taken along line IV-IV of FIG. 7.

FIGS. 7 and 8 illustrate a camera module 14, according to an embodiment.

The camera module 14 may be configured to enable short-distance and long-distance image capturing. For example, the camera module 14 may capture an object located at a short distance and a long distance by adjusting a focal length. The camera module 14 may be configured to be mounted on a portable terminal. For example, either one or both of a height (h) and a width (w) of the camera module 14 may be less than or equal to the thickness of the portable terminal. For example, the camera module 14 may have a height (h) smaller than the thickness of the portable terminal.

Referring to FIGS. 7 and 8, the camera module 14 may include, for example, the housing 100, the lens module 200, the optical path adjustment member 300, and the image sensor 400. However, the configuration of the camera module 14 is not limited to the above-described members. For example, the camera module 14 may further include the first driving assembly 510 and the support member 700.

The camera module 14 may further include a plurality of optical path folding members 610 and 620. For example, the camera module 14 may include a first optical path folding member 610 and a second optical path folding member 620.

The first optical path folding member 610 may convert an optical path incident in the height direction (h) of the camera module 14 to the longitudinal direction of the camera module 14. For example, the first optical path folding member 610 may reflect or refract the optical path incident along an optical axis C0 in the direction of the optical axis C1 intersecting the optical axis C0. The second optical path folding member 620 may reflect or refract the optical path refracted by the first optical path folding member 610 in the direction of the optical axis C2 of the lens module 200.

The lens module 200, the optical path adjustment member 300, and the image sensor 400 may have a predetermined distance relationship. For example, a distance from the rearmost lens 280 of the lens module 200 to the optical path adjustment member 300 may be smaller than a distance from the optical path adjustment member 300 to the imaging plane of the image sensor 400. That is, a distance L1 from an image side of the rearmost lens 280 to the first optical path folding portion 310 is smaller than a distance L2 from the second optical path folding portion 320 to the imaging plane of the image sensor 400.

Figure 9:
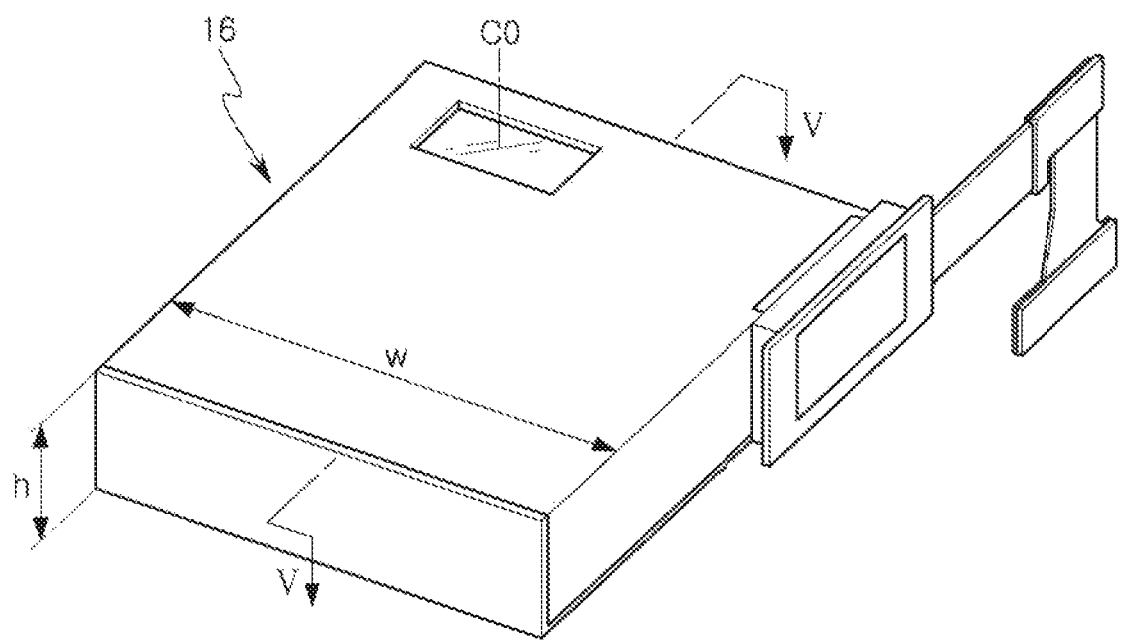
FIG. 9 is a perspective view of a camera module, according to an embodiment.
Figure 10:
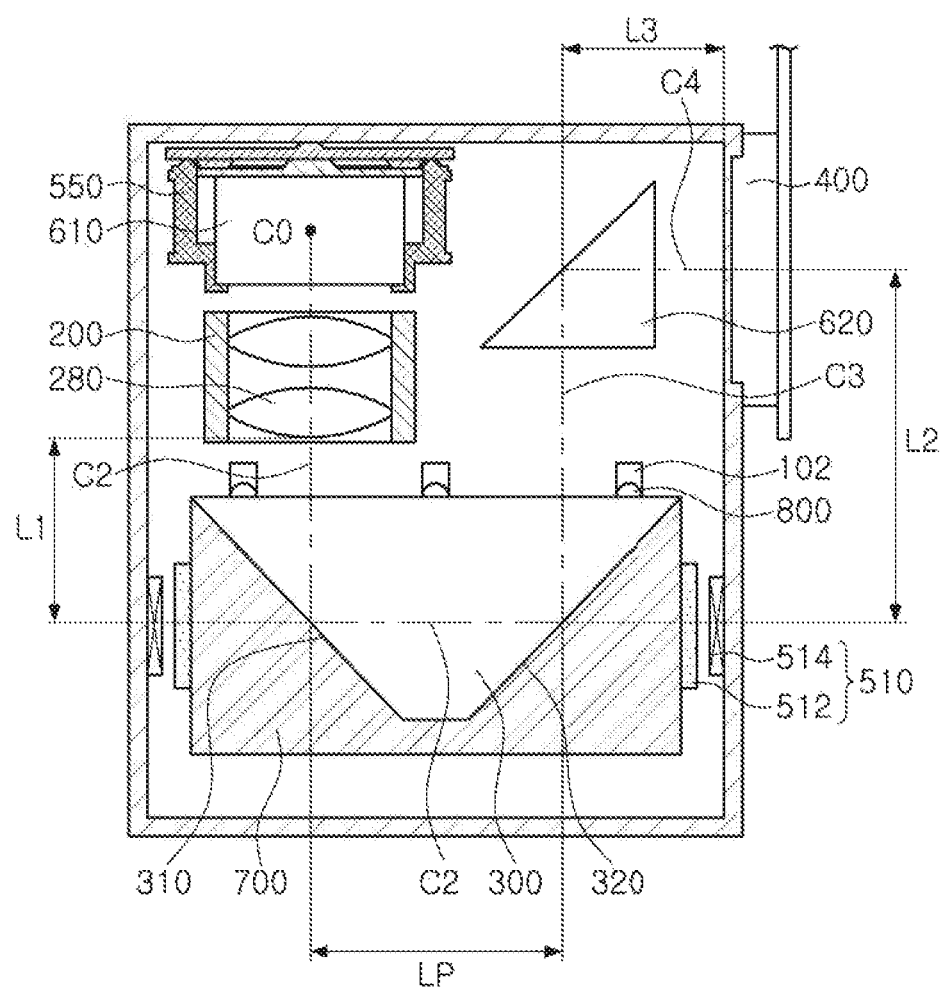
FIG. 10 is a cross-sectional view taken along line V-V of FIG. 9.

FIGS. 9 and 10 illustrate a camera module 16, according to an embodiment.

The camera module 16 may be configured to enable short-distance and long-distance image capturing. For example, the camera module 16 may capture an object located at a short distance and a long distance by adjusting a focal length. The camera module 16 may be configured to be mounted on a portable terminal. For example, either one or both of a height (h) and a width (w) of the camera module 16 may be less than or equal to the thickness of the portable terminal.

Referring to FIGS. 9 and 10, the camera module 16 may include, for example, the housing 100, the lens module 200, the optical path adjustment member 300, and the image sensor 400. However, the configuration of the camera module 16 is not limited to the above-described members. For example, the camera module 16 may further include the first driving assembly 510, the first optical path folding member 610, and the support member 700.

The camera module 16 may further include an image stabilization apparatus 550. The image stabilization apparatus 550 may be configured to drive the first optical path folding member 610 in a direction crossing the optical axes C0 and C1. The image stabilization apparatus 550 can actively drive the first optical path folding member 610 to reduce a phenomenon of a decrease in resolution caused by the shaking of the camera module 16.

The camera module 16 may further include the second optical path folding member 620. The second optical path folding member 620 may be disposed between the optical path adjustment member 300 and the image sensor 400. The second optical path folding member 620 may reflect or refract an optical path refracted by the optical path adjustment member 300 in a direction of the optical axis C4 of the image sensor 400.

The camera module 16 may secure a back focal length (BFL) from the rearmost lens 280 to the imaging plane of the image sensor 400 to be significantly long. For example, the back focal length (BFL) of the camera module 16 may be the sum of a distance L1 from the image side surface of the rearmost lens 280 to the first optical path folding portion 310 of the optical path adjustment member 300, a distance LP from the first optical path folding portion 310 to the second optical path folding portion 320, a distance L2 from the second optical path folding portion 320 to the second optical path folding member 620, and a distance L3 from the second optical path folding member 620 to the imaging plane of the image sensor 400.

Therefore, the camera module 16 may have a fairly long back focal length (BFL), and the focal length of the camera module 16 may be rapidly adjusted by changing the back focal length (BFL).

Figure 11:
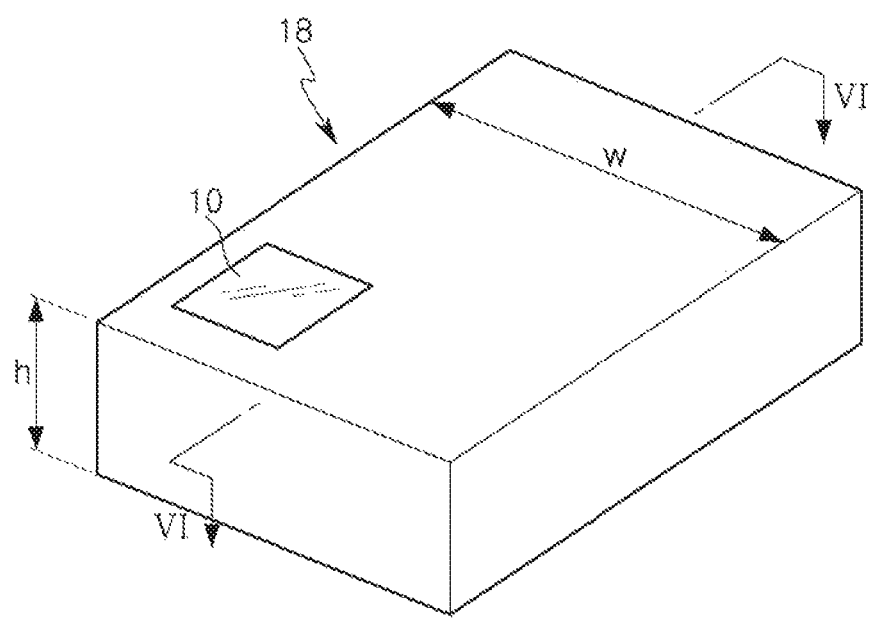
FIG. 11 is a perspective view of a camera module, according to an embodiment.
Figure 12:
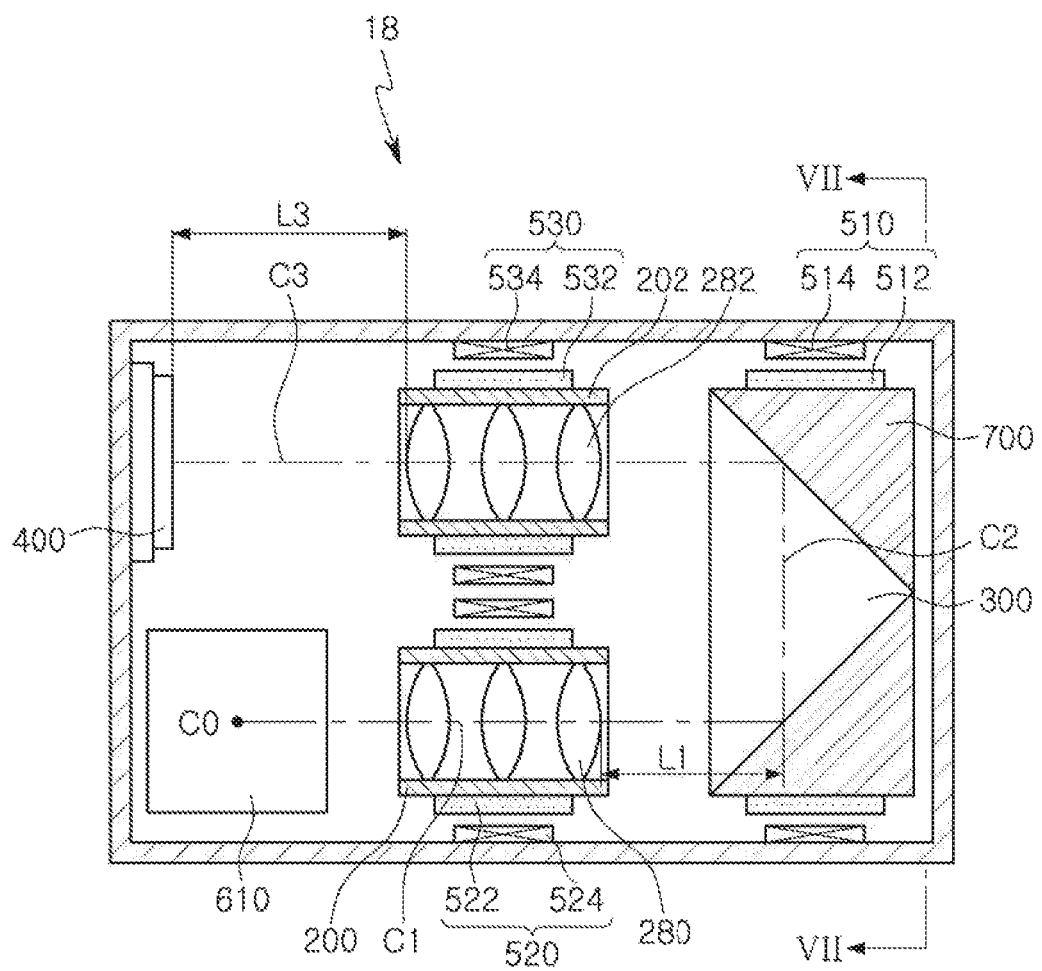
FIG. 12 is a cross-sectional view taken along line VI-VI of FIG. 11.
Figure 13:
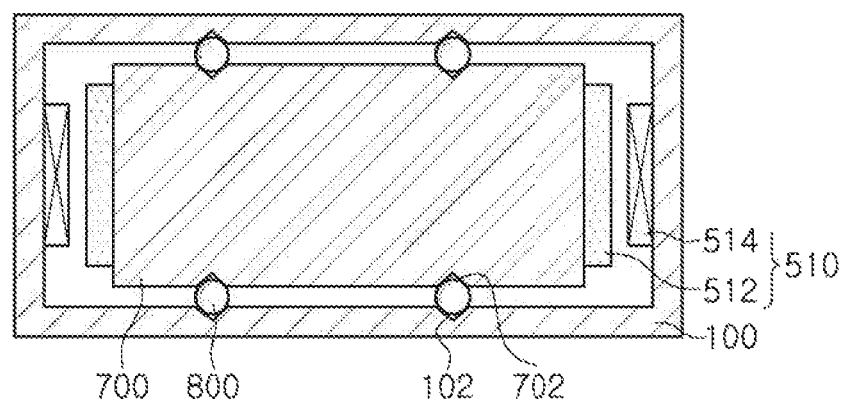
FIG. 13 is a cross-sectional view taken along line VII-VII of FIG. 12.

FIGS. 11 to 13 illustrate a camera module 18, according to an embodiment.

The camera module 18 may be configured to enable short-distance and long-distance image capturing. For example, the camera module 18 may capture an object located at a short-distance and a long-distance by adjusting a focal length. The camera module 18 may be configured to be mounted on a portable terminal. For example, either one or both of a height (h) and a width (w) of the camera module 18 may be less than or equal to the thickness of the portable terminal. For example, the camera module 18 may have a height (h) smaller than the thickness of the portable terminal.

Referring to FIGS. 11 to 13 camera module 16 may include, for example, the housing 100, the lens module 200 (referred to hereinafter as "the first lens module 200"), the optical path adjustment member 300, and the image sensor 400. However, the configuration of the camera module 16 is not limited to the above-described members. For example, the camera module 16 may further include the first driving assembly 510, the first optical path folding member 610, and the support member 700.

The camera module 16 may further include a second lens module 202. The second lens module 202 may be disposed between the optical path adjustment member 300 and the image sensor 400. The second lens module 202 may include one or more lenses 282.

The camera module 16 may further include a second driving assembly 520 and a third driving assembly 530 configured to drive the first lens module 200 and the second lens module 202, respectively, in directions of optical axes C1 and C3, respectively. The second driving assembly 520 is configured to move the first lens module 200 along the optical axis C1. For example, the second driving assembly 520 may move the first lens module 200 to be closer to the optical path adjustment member 300 or to be farther away from the optical path adjustment member 300. The second driving assembly 520 may include a second driving magnet 522 and a second driving coil 524. The second driving magnet 522 may be disposed in the first lens module 200, and the second driving coil 524 may be disposed in the housing 100. The second driving magnet 522 and the second driving coil 524 may be disposed to face each other, to provide a driving force required for the movement of the first lens module 200.

The third driving assembly 530 is configured to move the lens module 202 along the optical axis C3. For example, the third driving assembly 530 may move the second lens module 202 to be closer to the optical path adjustment member 300 or to move farther away from the optical path adjustment member 300. The third driving assembly 530 may include a third driving magnet 532 and a third driving coil 534. The third driving magnet 532 may be disposed in the second lens module 202, and the third driving coil 534 may be disposed in the housing 100. The third driving magnet 532 and the third driving coil 534 may be disposed to face each other, to provide a driving force required for the movement of the second lens module 202.

The camera module 18 configured as described above may be capable of focus adjustment and focus magnification adjustment. For example, the camera module 18 may change positions of the optical path adjustment member 300, the first lens module 200, and the second lens module 202 through the driving assemblies 510, 520, and 530, respectively, to quickly adjust the focus magnification, in addition to the focus position.

The camera module 18 may include elements for assisting smooth movement of the optical path adjustment member 300. For example, the camera module 18 may include the bearing member 800. The bearing member 800 may be disposed between the optical path adjustment member 300 or the support member 700 and the housing 100, to assist the optical path adjustment member 300 to be smoothly moved in the optical axis direction C1/C3. Grooves 102 and 702 for accommodating the bearing member 800 may be formed in the housing 100 and the support member 700, respectively. Cross-sections of the grooves 102 and 702 may generally be inverted triangular shapes. However, the cross-sectional shape of the grooves 102 and 702 is not limited to an inverted triangular shape.

As set forth above, according to the disclosure herein, a camera module may be capable of securing a back focal length of a sufficient size when the camera module is mounted on a small portable terminal.

Therefore, a camera module according to the disclosure herein may be capable of high-magnification focus adjustment and telephoto imaging.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. In addition, respective embodiments may be combined with each other. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a lens module comprising one or more lenses; and
an optical path adjustment member disposed to face the lens module or an imaging plane, and configured to be driven in a direction of an optical axis of the lens module to vary a distance from a rearmost lens of the lens module to the imaging plane,
wherein a distance from the rearmost lens to the optical path adjustment member is smaller than a distance from the optical path adjustment member to the imaging plane.

2. The camera module of claim 1, wherein the optical path adjustment member is configured such that an optical path of incident light incident on the optical path adjustment member is parallel to an optical path of emitted light emitted from the optical path adjustment member.

3. The camera module of claim 1, wherein the optical path adjustment member comprises a first optical path folding portion and a second optical path folding portion,
wherein the first optical path portion is configured to reflect or refract light incident from the lens module to the second optical path folding portion, and
wherein the second optical path folding portion configured to reflect or refract the light reflected or refracted from the first optical path folding portion to the imaging plane.

4. The camera module of claim 1, further comprising:
a first driving assembly configured to move the optical path adjustment member in a direction parallel to the optical axis.

5. The camera module of claim 1, further comprising:
a first optical path folding member configured to reflect or refract light reflected from an object to the lens module.

6. The camera module of claim 5, further comprising:
an image stabilization apparatus configured to drive the first optical path folding member in a direction intersecting the optical axis.

7. The camera module of claim 1, wherein the lens module comprises a lens configured to have different lengths in a first direction intersecting the optical axis and a second direction intersecting the optical axis.

8. The camera module of claim 1, further comprising:
a second optical path folding member disposed between the optical path adjustment member and the imaging plane, and configured to reflect or refract light to the imaging plane.

9. The camera module of claim 1, further comprising:
a second driving assembly configured to move the lens module in the direction of the optical axis.

10. The camera module of claim 1, further comprising:
a support member supporting the optical path adjustment member;
a housing configured to receive the lens module and the support member; and
a bearing member disposed between the support member and the housing to enable movement of the support member in the direction of the optical axis.

11. A camera module, comprising:
a first lens module including a first lens group disposed along a first optical axis;
a second lens module including a second lens group disposed along a second optical axis parallel to the first optical axis;
an optical path adjustment member configured to reflect or refract light refracted by the first lens module to the second lens module;
a first driving assembly configured to move the optical path adjustment member in a direction of the first optical axis;
a second driving assembly configured to move the first lens module in the direction of the first optical axis; and
a third driving assembly configured to move the second lens module in the direction of the second optical axis.

12. The camera module of claim 11, further comprising:
a support member supporting the optical path adjustment member;
a housing configured to receive the lens module and the support member; and
a bearing member disposed between the support member and the housing to enable movement of the support member in the direction of the first optical axis.

13. The camera module of claim 11, further comprising:
an optical path folding member configured to reflect or refract incident light to the first lens module,
wherein the incident light is incident in a direction of a third optical axis perpendicular to the first optical axis.

14. The camera module of claim 11, wherein the first driving assembly is further configured to move the optical path adjustment member relative to the first lens module and the second lens module in the direction of the first optical axis,
wherein the second driving assembly is further configured to move the first lens module relative to the second lens module and the optical path adjustment member in the direction of the first optical axis, and wherein the third driving assembly is further configured to move the second lens module relative to the first lens module and the optical path adjustment member in the direction of the second optical axis.

15. A camera module, comprising:

a lens module comprising one or more lenses;

an optical path adjustment member disposed to face the lens module or an imaging plane, and configured to be driven in a direction of an optical axis of the lens module to vary a distance from a rearmost lens of the lens module to the imaging plane; and a first optical path folding member configured to reflect or refract light reflected from an object to the lens module.

16. The camera module of claim 15, wherein the optical path adjustment member is configured such that an optical path of incident light incident on the optical path adjustment member is parallel to an optical path of emitted light emitted from the optical path adjustment member.

17. The camera module of claim 15, wherein the optical path adjustment member comprises a first optical path folding portion and a second optical path folding portion, wherein the first optical path portion is configured to reflect or refract light incident from the lens module to the second optical path folding portion, and wherein the second optical path folding portion configured to reflect or refract the light reflected or refracted from the first optical path folding portion to the imaging plane.

18. The camera module of claim 15, further comprising:

a first driving assembly configured to move the optical path adjustment member in a direction parallel to the optical axis.

19. The camera module of claim 15, further comprising:

an image stabilization apparatus configured to drive the first optical path folding member in a direction intersecting the optical axis.

* * * * *